Dec. 18, 1956     H. KURKJIAN     2,774,454
CLUTCHES

Filed Aug. 25, 1953     2 Sheets-Sheet 1

*INVENTOR.*
HAIG KURKJIAN
BY
ATTORNEY

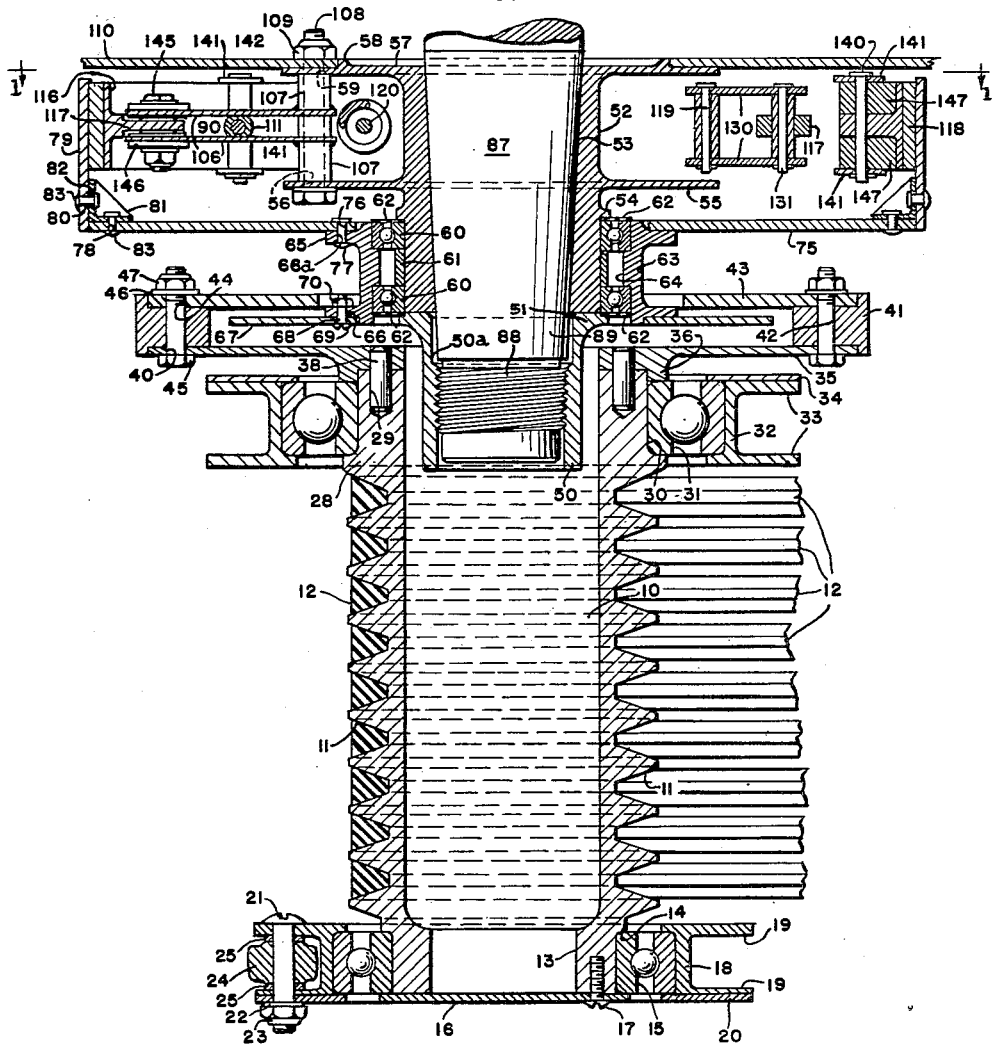

United States Patent Office 2,774,454
Patented Dec. 18, 1956

2,774,454

CLUTCHES

Haig Kurkjian, Drexel Hill, Pa.

Application August 25, 1953, Serial No. 376,290

8 Claims. (Cl. 192—105)

This invention relates to clutches and more particularly to clutches suitable for use in rotary wing aircraft.

It is the principal object of the present invention to provide a clutch suitable for use in rotary wing aircraft under the varying conditions encountered in operation, including intermittent driving and auto rotation.

It is a further object of the present invention to provide a clutch for use in rotary wing aircraft capable of transmitting the maximum delivered torque from the engine to the rotary wing.

It is a further object of the present invention to provide a clutch for use in rotary wing aircraft capable of operating without engine drag under conditions of auto rotation.

It is a further object of the present invention to provide a clutch for use in rotary wing aircraft capable of operating with a minimum of engine drag under gliding conditions.

It is a further object of the present invention to provide a clutch for use in rotary wing aircraft which may be readily assembled and disassembled for inspection and overhaul.

Other objects and advantageous features of the present invention will be apparent from the specification and claims.

The nature and characteristics of the present invention will be more readily understood from the following description, taken in connection with the accompanying drawings forming part hereof, in which:

Fig. 2 is a vertical sectional view taken approximately on the line 2—2 of Fig. 1; and Fig. 3 is a fragmentary vertical sectional view taken approximately on the line 3—3 of Fig. 1.

Figure 1:
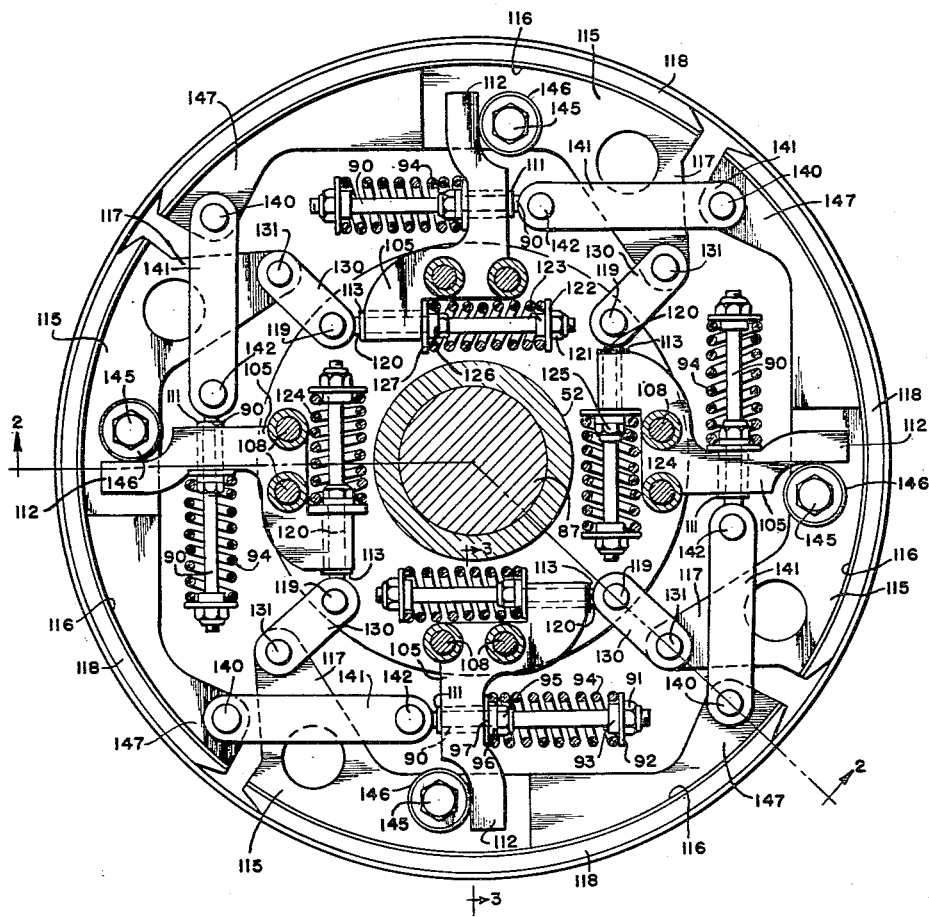
Figure 1 is a horizontal sectional view of a preferred form of clutch in accordance with the present invention taken approximately on the line 1—1 of Fig. 2.

It should, of course, be understood that the description and drawings herein are illustrative merely, and that various modifications and changes may be made in the structure disclosed without departing from the spirit of the invention.

Like numerals refer to like parts throughout the several views.

Referring now more particularly to the drawings the clutch of the present invention preferably includes an elongated vertical cylindrical hollow shaft 10 having on the exterior thereof a plurality of integral vertically spaced annularly disposed pulley grooves 11 of a trapezoidal configuration in cross section. A plurality of belts 12, preferably of the type known as V-belts, is provided for engagement in the pulley grooves 11 to supply a driving action to any desired mechanism such as a rotary wing. At the lower end of the shaft 10, extending a short distance downwardly therefrom a hollow hub 13 is provided integral therewith having a somewhat smaller inside diameter. A suitable annular recess 14 is provided in the exterior of the hub 13 for the reception of the inner race of a ball bearing 15. A flat horizontal circular plate 16 is provided in engagement with the bottom surface of the hub 13 and extending outwardly to provide a ledge for supporting engagement with the inner bottom surface of the inner race of the bearing 15. The plate 16 is held in place by a plurality of spaced bolts 17 which pass through suitable holes in the plate 16 and are secured within suitable corresponding openings in the hub 13.

The outer race of the bearing 15 is in engagement along its outer circumference with a circular support 18. The support 18 at the upper and lower outer portions thereof and integral therewith is provided with a pair of flat spaced parallel outwardly extending horizontal walls 19. A flat horizontal circular plate 20 is provided in engagement with the bottom of the lower of the walls 19, and extends inwardly for a short distance to provide a ledge for supporting engagement with the outer bottom surface of the outer race of the bearing 15. Each of the walls 19 and the plate 20 has a pair of diametrically spaced bolts 21 extending therethrough. A washer 22 in engagement with the bottom of the plate 20 and a nut 23 in engagement with the washer 22 are provided for each of the bolts 21 for securing the position of the parts concerned. A pair of horizontally disposed eye rods 24, extending substantially tangentially from but not actually in contact with the support 18, is provided interposed between the walls 19 and secured in position by the bolts 21 which pass through the eyes of the rods 24. Spacer washers 25 are provided on the bolts 21 above and below the eye of each of the rods 24 and in snug engagement with the inner surface of the walls 19 to maintain the spaced location of the rods 24.

The shaft 10 is provided with an upwardly extending integral extension 28 having a plurality of vertically disposed openings 29 therein for purposes to be explained. An annular groove 30 is provided in the exterior of the extension 28 to permit supporting engagement with the inner race of a ball bearing 31. The outer race of the bearing 31 is mounted in a circular support 32. The support 32 at the upper and lower outer portions thereof and integral therewith is provided with a pair of outwardly extending flat spaced parallel horizontal walls 33. A flat horizontal circular plate 34 is provided superposed on the upper of the walls 33 and extending inwardly for a short distance for engagement with the outer upper surface of the outer race of the bearing 31 for maintaining the position of the parts concerned.

A horizontal plate 35 is provided having its lower inner portion in engagement with the inner race of the bearing 31 and the extension 28 for maintaining the position of the parts concerned. The plate 35 is provided with a horizontally inwardly extending integral portion 36, the bottom surface of which is in engagement with the extension 28. A plurality of pins 38 extend through the portion 36 and into the openings 29 for keying together the plate 35 and the extension 28. The plate 35 is provided at an outer location thereof with a plurality, preferably four, of suitable holes 40 preferably equally spaced quadrantly. A horizontal spacer ring 41, T-shaped in cross section, is provided superposed on the plate 35 so that the ring 41 engages the plate 35 along the outer upper surface and the outer edge surface thereof. The ring 41 is provided with a plurality of holes 42 in vertical axial alinement with the holes 40. A flat horizontal ring 43 is provided, in spaced parallel relation with and above the plate 35, superposed on the ring 41 so that the outer lower surface and outer edge surface of the ring 43 engage the ring 41. A plurality of holes 44 is provided in the ring 43 in vertical axial alinement with the holes 40 and 42 for the reception of inverted bolts 45, each having a washer 46 and nut 47 for the purpose of holding these portions of the structure in assembled relation and permitting disassembly at this location.

A cylindrical internally threaded nut 50 is provided extending within and somewhat above the interior of the shaft 10 having an internal circumferential shoulder 50a. The upper portion of the nut 50 is provided with an outwardly extending annular flange 51. An elongated vertical cylindrical clutch hub 52 is provided superposed on the topmost surface of the nut 50 and having an interior axial opening 53 tapering upwardly and outwardly. The hub 52 is provided with a generally centrally disposed shoulder 54. A short vertical distance above the shoulder 54 the hub 52 is provided with an outwardly extending flat horizontal cylindrical disc 55, integral therewith, having a plurality of spaced holes 56 near the circumference thereof. A flat horizontal cylindrical disc 57 is provided in spaced parallel relation above the disc 55 integral with and at the topmost part of the hub 52 and having a flange portion 58 extending vertically upwardly from and integral with the top surface of the disc 57 at an outer portion thereof. A plurality of holes 59 is provided in the plate 57 between the portion 58 and the circumference of the plate 57.

A pair of ball bearings 60 is provided with their inner races positioned on the hub 52 and maintained in spaced relation by a spacer ring 61. A pair of spaced parallel radially disposed sealing discs 62 is provided, the upper of which is interposed between the top of the upper bearing 60 and the bottom surface of the portion 54 and the lower of which is interposed between the bottom of the lower bearing 60 and the top outer surface of the flange 51, to prevent the discharge of bearing lubricant. A hollow cylindrical housing 63 is provided having recesses for the reception of the outer races of the bearings 60 with an inwardly extending rim 64 providing the top and bottom boundaries of the recesses. The housing 63 is provided with a pair of spaced parallel horizontal circular flanges 65 integral therewith, extending outwardly therefrom, and having a plurality of spaced holes 66 and 66a therein. A horizontal plate 67 is provided in spaced parallel relation with and between the plates 35 and 43 and having an inner surface in engagement with the housing 63 and an inner upper surface in engagement with the bottom surface of the lower of the flanges 65. The plate 67 is provided with a plurality of spaced holes 68 alined with the holes 66. A bolt 69 is inserted upwardly through the holes 66 and 68 and secured therein by a nut 70 to maintain the parts concerned in assembled relation.

A horizontal circular plate 75 is provided having an inner circumferential surface in engagement with the housing 63 and an inner lower surface in engagement with the top surfaces of the upper of the flanges 65. A plurality of spaced holes 76 is provided, through an inner portion of the plate 75, in alinement with the holes 66a for the reception therethrough of a corresponding plurality of rivets 77. A plurality of spaced holes 78 is provided through an outer portion of the plate 75. At the outer circumferential vertical surface of the plate 75 and in abutting engagement therewith, a vertical hollow cylindrical drum 79 is provided having a plurality of spaced holes 80 through a lower portion thereof axially normal to and positioned above the holes 78. A bracing ring 81 is provided in circumferential engagement with the inner lower surface of the drum 79 and the upper outer surface of the plate 75. A plurality of spaced holes 82 is provided in the plate 81 in alinement with the holes 78 and 80 for the reception of rivets 83 therethrough.

A plurality of vertically disposed equally spaced hollow housings 84 is provided positioned intermediate the plates 67 and 75 and secured at a plurality of locations to the spacer ring 41 preferably by rivets. The housings 84 are positioned quadrantly in alternate relation to the bolts 45. Interior to each of the members 84 and secured thereto a self aligning connector which may be of resilient material, such as rubber, is provided extending between and in engagement with the plates 67 and 75. The connectors 85 are positioned so that an opening therethrough is in axial alignment with corresponding holes in the plates 67 and 75 for the reception of a bolt 86, which is held in place by a nut 86a.

A vertically disposed driving shaft 87 is provided having a tapered section 89 with which the opening 53 of the hub 52 is in engagement and a threaded section 88 with which the nut 50 is in engagement. The shaft 87 may be driven in any desired manner such as directly by an internal combustion engine (not shown).

A plurality of horizontally disposed drive brackets 105 is provided, each having a pair of parallel plates 106 to which a pair of spaced mounting sleeves 107 is secured. The sleeves 107 are rigidly connected by bolts 108 having nuts 109 thereon, to the flange portions 58 through the holes 59 and to the disc 55 through the holes 56. The nuts 109 are provided on the top ends of the bolts 108 to facilitate assembly and disassembly.

A guard plate 110 is also mounted on the flange portions 58 and held by the bolts 108.

The plates 106 outwardly and offset from the sleeves 107 each has a horizontally disposed sleeve 111 and outwardly disposed abutment portions 112. Intermediate the sleeves 107 and the abutment portions 112, horizontal sleeves 113 are provided.

A plurality of clutch shoes 115 is provided, one for each of the brackets 105. The clutch shoes 115 each has a vertical arcuate section 116 and an inwardly extending horizontally disposed flange section 117.

The outer faces of the arcuate sections 116 are each preferably provided with shoe facings or linings 118, an industrial asbestos lining material having brass incorporated therein to increase the coefficient of friction being suitable. The linings 118 are adapted to be moved into engagement with the inner face of the drum 79 as hereinafter pointed out.

Each of the flange sections 117 is pivotally connected at one end by a vertical pivot pin 131 to one end of vertically spaced links 130, the other ends of the links 130 each being connected by vertical pivot pins 119 to eye bolts 120 which extend through the sleeves 113 in the next brackets 105 beyond in a counterclockwise direction. The bolts 120 on the sides of the sleeves 113 opposite the pins 119, are each provided with abutment washers 127 and have positioning washers 126 with which nuts 125 are in engagement. On the outer ends of the bolts 120, positioning washers 123 and abutment washers 122 are provided, positioned by nuts 121. Interposed between the abutment washers 127 and 122 and held at their ends from sidewise displacement by the positioning washers 126 and 123, coil springs 124 are mounted.

Each of the flange sections 117 is pivotally connected at the opposite end by a vertical pivot pin 140 to one end of vertically spaced links 141 which are held in proper spaced relation by spacers 147. The other ends of the links 141 are connected by vertical pivot pins 142 to the eye portions of eye bolts 90 which extend through the sleeves 111 in the next brackets 105 beyond in a clockwise direction. The bolts 90, on the sides of the sleeves 111 opposite the pins 142, are each provided with abutment washers 97 and have positioning washers 96 with which nuts 95 are in engagement. On the outer ends of the bolts 90, positioning washers 93 and abutment washers 92 are provided, positioned by nuts 91. Interposed between the abutment washers 97 and 92, and held at their ends from sidewise displacement by the positioning washers 96 and 93, coil springs 94 are mounted.

Each of the flange sections 117, intermediate its ends, is provided with a bolt 145 on which spaced rollers 146 are mounted for engagement under certain conditions with the abutment portions 112 of the drive brackets 105.

The mode of operation will now be pointed out.

The speed of the engine, and the shaft 87 driven thereby, is the determining factor that governs the operation of the clutch of the present invention. With the engine at rest, the clearance between the linings 118 and the drum 79 is preferably adjusted so as to be in the approximate range of from five to six one-thousandths of an inch.

When the engine is started and the shaft 87 rotated, the hub 82 and discs 55 and 57 are rotated therewith. The rotation of the discs 55 and 57, also, through the links 130 and 141 causes rotation of the clutch shoes 115, and the centrifugal forces, initially acting on the shoes 115, increase as the engine speed increases, enhancing the tendency in each of the shoes 115 to move outwardly. This tendency is controlled in part by the setting and spring rate of the springs 94 and 124 so that the abutments 112 do not engage the rollers 146 at lower speed levels. The springs 94 and 124 are preferably set on assembly at predetermined compressed values so that the shoes 115 will not move outwardly toward the drum 79 until a predetermined centrifugal force is attained. For purposes of explanation it may be assumed that that predetermined centrifugal force is reached at approximately 1300 revolutions per minute. Under this condition, the springs 94 and 124 are compressed further, so that the shoes 115 move outwardly until the linings 118 make contact with the drum 79.

It will be seen that any driving force exerted on the drum 79 is transmitted through the plate 75 and the coupling bolts 86 to the ring 43 and therefrom, through the plate 35, to the shaft 10 for driving the belts 12.

As the rotationl speed of the motor and of the shaft 87 is increased still further, the force of the gripping engagement of the linings 118 against the drum 79 increases enabling the clutch to carry a greater torque, until at a higher predetermined speed, which for purposes of explanation may be taken as 1400 revolutions per minute, the engine power will be transmitted to the drum 79 without slippage. Actually, little power will be lost by slippage and heat from the time the linings 118 make contact with the drum 79 at the lower predetermined speed level until the contact is firmly established at the next higher predetermined speed level, since only a short time is required to increase the engine speed from one level to the next.

At and above the above mentioned higher predetermined speed the clutch is capable of transmitting the torque required for testing the rotational speed of the rotary wing prior to the take-off of the helicopter. At minimum flight speed, which for purposes of explanation is taken as about 2000 revolutions per minute, the clutch is capable of transmitting the maximum delivered engine torque.

When the helicopter is in flight there will be periods of auto rotation when the rotary wing receives its power from aerodynamic forces working on the rotor blades. Normally, such auto rotation occurs intermittently and may run for about 15 to 20 minutes at a time. During the period of auto rotation the drum 79 should be disengaged from the linings 118 so that no engine drag will interfere with the auto rotative conditions. Otherwise, auto rotative forces would cause rotation of the crankshaft 87. In order to prevent such an occurrence, when conditions of auto rotation occur, contact between the abutments 112 and the rollers 146 is broken since contact between these two parts permits transmission of torque in one direction only and that from the shaft 87 to the drum 79. When contact between the abutments 112 and the rollers 146 is broken the engine speed can drop to zero. No centrifugal forces are acting on the shoes 115 and hence the rotor system is under a state of complete free wheeling.

When the helicopter is operating under conditions of reduced power, such as in glide descents, auto rotative forces acting on the rotor blades will enable the rotor to operate with a minimum of engine drag. When the drum 79 tends to rotate at a higher speed than the shoes 115, pivotal action of the links 130 and 141 enables the shoes 115 to move in the same direction as the drum 79, breaking contact between the abutments 112 and the rollers 146. This movement of the shoes 115 begins as the drum 79 tends to overrun, compressing the springs 94 and 124 until the rear portions of the abutments 112 engage contiguous portions of the shoes 115, thus restricting further outward travel of the shoes 115. Since the links 130 travel in a smaller arc than the links 141, the forward ends of the shoes 115 clear the drum 79 while the opposite ends maintain contact with the drum 79. This contact is at a low frictional value, compared to that under driving conditions, but is sufficient to act as a slight drag to the rotor similar to other overrunning devices.

I claim:

1. A clutch comprising a driving member, a driven member having a drum, a plurality of spaced driving brackets carried by said driving member, each of said driving brackets having an abutment member thereon, a plurality of shoe members corresponding to said bracket members for engagement with said drum, a pivotal connection from each of said shoe members to the next driving bracket in one direction, a second pivotal connection from each of said shoe members to the next driving bracket in the opposite direction, and said shoe members having portions for driving engagement by said abutment member.

2. A clutch comprising a driving member, a driven member having a drum, a plurality of spaced driving brackets carried by said driving member, each of said driving brackets having an abutment member thereon, a plurality of shoe members corresponding to said bracket members for engagement with said drum, a pivotal connection from each of said shoe members to the next driving bracket in one direction, an adjustable resilient member interposed in said connection, a second pivotal connection from each of said shoe members to the next driving bracket in the opposite direction, an adjustable resilient member interposed in said second connection, and said shoe members having portions for driving engagement by said abutment member.

3. A clutch comprising a driving member, a driven member having a drum, a plurality of spaced driving brackets carried by said driving member, each of said driving brackets having an abutment member thereon, a plurality of shoe members corresponding to said bracket members for engagement with said drum, a pivotal connection including a link from each of said shoe members to the next driving bracket in one direction, an adjustable resilient member interposed in said connection, a second pivotal connection including a link of different length than said first mentioned link from each of said shoe members to the next driving bracket in the opposite direction, an adjustable resilient member interposed in said second connection, and said shoe members having portions for driving engagement by said abutment member.

4. A clutch comprising a rotatable driving member, a rotatable driven member, said driven member having a drum, a plurality of spaced driving brackets carried by said driving member, each of said driving brackets having spaced sleeves, each of said driving brackets having an abutment member thereon, a plurality of shoe members corresponding respectively to said driving brackets and having peripheral portions for engagement with said drum, a pivotal connection from each of said shoe members to one of the sleeves of the next driving bracket in one direction, an adjustable resilient member carried by said sleeve and connected to said pivotal connection, a second pivotal connection from each of said shoe members to one of the sleeves of the next driving bracket in the opposite direction, another adjustable resilient member carried by said second mentioned sleeve and connected to said second pivotal connection, and said shoe members having portions for driving engagement by said abutment member.

5. A clutch comprising a rotatable driving member, a coaxial rotatable driven member, said driven member having a drum, a plurality of spaced driving brackets carried by said driving member, each of said driving brackets having spaced sleeves in planes normal to the rotational axis of the driving and driven members, each of said driving brackets having an abutment member thereon, a plurality of shoe members corresponding respectively to said driving brackets and having peripheral portions for engagement with said drum, a pivotal connection from each of said shoe members to one of the sleeves of the next driving bracket in one direction, an adjustable resilient member carried by said sleeve and connected to said pivotal connection, a second pivotal connection from each of said shoe members to one of the sleeves of the next driving bracket in the opposite direction, another adjustable resilient member carried by said second mentioned sleeves and connected to said second pivotal connection, and said shoe members having portions for driving engagement by said abutment member.

6. A clutch comprising a rotatable driving member, a rotatable driven member, said driven member having a drum, a plurality of spaced radially outwardly extending driving brackets carried by said driving member, each of said driving brackets having spaced sleeves, each of said driving brackets having an abutment member thereon, a plurality of shoe members corresponding respectively to said driving brackets and having peripheral portions for engagement with said drum, a pivotal connection including a link from each of said shoe members to one of the sleeves of the next driving bracket in one direction, an adjustable resilient member carried by said sleeve and connected to said pivotal connection, a second pivotal connection including a link of different length than said first mentioned link from each of said shoe members to one of the sleeves of the next driving bracket in the opposite direction, another adjustable resilient member carried by said second mentioned sleeve and connected to said second pivotal connection, and said shoe members having portions for driving engagement by said abutment member.

7. A clutch comprising a rotatable driving member, a rotatable driven member, said driven member having a drum, a plurality of spaced driving brackets carried by said driving member, each of said driving brackets at the central portion thereof having a sleeve and at the inner portion thereof having another sleeve, each of said driving brackets having an abutment member thereon, a plurality of shoe members corresponding respectively to said driving brackets and having peripheral portions for engagement with said drum, a pivotal connection from each of said shoe members to one of the sleeves of the next driving bracket in one direction, an adjustable resilient member carried by said sleeve and connected to said pivotal connection, a second pivotal connection from each of said shoe members to one of the sleeves of the next driving bracket in the opposite direction, another adjustable resilient member carried by said outer sleeve and connected to said second pivotal connection, and said shoe members having portions for driving engagement by said abutment member.

8. A clutch comprising a rotatable driving member, a driven member coaxial with the driving member and rotatably supported on said driving member, said driven member having a drum, a plurality of spaced transversely disposed driving brackets carried by said driving member, each of said driving brackets at the central portion thereof having a central sleeve and at the inner portion thereof having an inner sleeve, each of said driving brackets at the outer portion thereof having an abutment member thereon, a plurality of shoe members corresponding respectively to said driving brackets and having peripheral portions for engagement with said drum, a pivotal connection including a link from each of said shoe members to the inner sleeve of the next driving bracket in one direction, an adjustable resilient member carried by said sleeve and connected to said pivotal connection, a second pivotal connection including a link of different length than said first mentioned link from each of said shoe members to the outer sleeve of the next driving bracket in the opposite direction, another adjustable resilient member carried by said outer sleeve and connected to said second pivotal connection, and said shoe members having portions for driving engagement by said abutment member.

References Cited in the file of this patent

UNITED STATES PATENTS

| 1,894,890 | Rossi | Jan. 17, 1933 |
| 2,596,193 | Zieg | May 13, 1952 |

FOREIGN PATENTS

| 96,838 | Sweden | July 13, 1939 |